United States Patent [19]

Furukawa et al.

[11] Patent Number: 4,920,438
[45] Date of Patent: Apr. 24, 1990

[54] MAGNETIC HEAD UNIT AND METHOD OF MANUFACTURING THE SAME

[75] Inventors: Masatoshi Furukawa, Nagaoka; Kazuo Kobayshi, Furukawa, both of Japan

[73] Assignee: Alps Electric Co., Ltd., Tokyo, Japan

[21] Appl. No.: 334,788

[22] Filed: Apr. 6, 1989

Related U.S. Application Data

[63] Continuation of Ser. No. 925,825, Oct. 30, 1986, abandoned.

[30] Foreign Application Priority Data

Oct. 30, 1985 [JP] Japan .................. 60-241654

[51] Int. Cl.$^5$ ............................................. G11B 5/48
[52] U.S. Cl. ..................................... 360/104; 360/128
[58] Field of Search ............................. 360/104, 128

[56] References Cited

U.S. PATENT DOCUMENTS

| 4,487,649 | 12/1984 | Oyi et al. ................. | 29/603 |
| 4,620,250 | 10/1986 | Hills ....................... | 360/104 |
| 4,647,998 | 3/1987  | Onohara et al. ............ | 360/104 |
| 4,651,243 | 3/1987  | Daste et al. ............... | 360/104 |
| 4,658,315 | 4/1987  | Seki et al. ................ | 360/104 |
| 4,700,249 | 10/1987 | Aikawa et al. ............. | 360/104 |

FOREIGN PATENT DOCUMENTS 57-147160  9/1982  Japan .

Primary Examiner—John H. Wolff
Attorney, Agent, or Firm—Guy W. Shoup; Stephen L. Malaska; Paul J. Winters

[57] ABSTRACT

A magnetic head unit comprising a magnetic head supporting member provided with a magnetic head receiving hole formed in an extremity thereof, and a reading/writing magnetic head placed within the magnetic head receiving hole at a correct position with respect to reference surfaces formed in the underside of the magnetic head supporting member and adhesively fixed to the inner surface of the magnetic head receiving hole. The magnetic head unit is assembled by placing the magnetic head supporting member on a jig having a magnetic head supporting groove and protrusions for supporting the magnetic head supporting member thereon so that the reference surfaces of the magnetic head supporting member are located in parallel to and at a predetermined height from the bottom surface of the magnetic head supporting groove, inserting the magnetic head into the magnetic head receiving hole and placing the same on the bottom surface of the magnetic head supporting groove, temporarily fixing the magnetic head to the inner surface of the magnetic head receiving hole with a quick hardening adhesive, and firmly fixing the magnetic head to the magnetic head supporting member with an adhesive.

2 Claims, 2 Drawing Sheets

MAGNETIC HEAD UNIT AND METHOD OF MANUFACTURING THE SAME

This application is a continuation of application Ser. No. 06/925,825 filed Oct. 30, 1986 now abandoned.

BACKGROUND OF THE INVENTION

1. Field of the Invention

The present invention relates to a magnetic head unit for writing information in and reading information from both sides of a disk shaped magnetic recording medium and a method of manufacturing such a magnetic head unit.

2. Description of the Prior Art

Two-sided recording type disk driving devices for writing information in and reading information from both sides of a disk-shaped magnetic recording medium (hereinafter referred to simply as "disk") are classified by the configuration of the magnatic head supported by a gimbal spring or gimbal springs into three categories, namely, a movable upside/fixed downside system providing a gimbal spring only on a holding case, a fixed upside/movable downside system providing a gimbal spring only on a carriage, and a movable upside/movable downside system providing gimbal springs on both the holding case and the carriage.

In the movable upside/fixed downside system, since the carriage supporting the lower magnetic head is guided directly by a guide bar, the reference plane can be easily established, and hence this system has been widely used. On the other hand, in the fixed upside/movable downside system, since the holding case is supported pivotally on the carriage, the fixed upside/movable downside system has difficulty in establishing the reference plane. Although the movable upside/movable downside system is capable of satisfactory performance, it presents difficulties greater than that of the fixed upside/movable downside system in establishing the reference plane, and hence, in practical application, the movable upside/movable downside system is substantially the movable upside/semi-fixed downside system in which the motion of the gimbal spring provided on the carriage is restricted.

As compared with the movable upside/fixed downside system, the fixed upside/movable downside system has greater difficulty in establishing the reference plane, whereas the following performance of the fixed upside/movable downside system is satisfactory. Accordingly, future development of the fixed upside/movable downside system is desirable. In the movable upside/fixed downside system, the upper holding case has two movable parts, namely, a joint of the holding case and the carriage, and the gimbal spring. Therefore, the following performance of the system is deteriorated in the secondary delay in the following action of those two parts in following the irregularity in the disk. On the contrary, in the fixed upside/movable downside system, the position of the upper magnetic head varies scarcely and the gimbal spring is the only movable part of the lower magnetic head, and hence secondary delay does not occur in the following performance and the fixed upside/movable downside system is advantageous in respect of following performance. Japanese Unexamined Patent Publication No. 57-147160 discloses an invention made in view of such an advantage of the fixed upside/movable downside system. This known invention will be described hereinafter with reference to FIG. 2.

A magnetic head supporting mechanism shown in FIG. 2 is constituted mainly of an arm (holding case) 34 mounted with a magnetic head 32 and a carriage 36 mounted with a magnetic head 33. The arm 34 is connected swingably to the carriage 36 by means of a hinge 35 projecting from the side wall 36a of the carriage 36. The hinge 35 is a spring plate. A predetermined pressure is applied to the arm 34 with a coil spring 37 compressively provided between the arm 34 and the upper wall 36b of the carriage 36. The upper magnetic head 32 is fixed directly to the underside of the arm 34, while the lower magnetic head 33 is attached to the upper surface of the carriage 36 by means of a gimbal plate 38 so that the upper magnetic head 32 and the lower magnetic head 33 are disposed opposite to each other with a disk (flexible disk) 31 therebetween. A supporting spring plate 41 provided with a pivot 40 at the free end thereof is provided with a through hole 39 formed in the lower wall 36c of the carriage 36 below the gimbal plate 38, to press the gimbal plate 38 upward against the disk 31.

The application of the present application proposed an invention, with the same purpose as that of the above-mentioned prior invention, to enable further accurate establishment of a reference plate for the magnetic head mounted on the arm 34. This previous invention will be described hereunder with reference to FIG. 3.

As illustrated in FIG. 3, a magnetic head unit 1 is constituted mainly of a lower magnetic head assembly 40 and an upper magnetic head assembly 30. The magnetic head unit is moved by a pulse motor, not shown, along a guide shaft 4 in the radial direction of a disk 5.

The lower magnetic head assembly 40 comprises a carriage 2, a lower magnetic head 7 mounted through a gimbal spring 6 to the extremity of the carriage 2, a flexible printed wiring board 9 connected to the lower magnetic head 7 with lead wires 8, and lead terminals 10 connected to the flexible printed wiring board 9 and projecting from the base end of the carriage 2. The lead terminals 10 are formed by dividing a conductive metallic plate into five divisions which are incorportated integrally into the carriage 2 by insert molding. One end of each lead terminal 10 is extended near to the gimbal spring 6. The molded carriage 2 integrally has a pivot 11 which abuts against the underside of the gimbal spring 6 at a position corresponding to the lower magnetic head 7 to secure the abutment of the lower magnetic head against the disk 5, and a cylindrical supporting surface 12 which abuts directly on a holding case 3 to support the latter.

The upper magnetic head assembly 30 comprises the holding case 3, a fastening plate 16, and a spring leaf hinge 14 which supports the holding case 3 for swing motion relative to the fastening plate 16. An upper magnetic head 13 is positioned opposite the lower magnetic head 7 mounted on the carriage 2 and is fixed to a plate 21 fixed to the holding case 3. A spring 19 is provided compressively between a holding plate 18 and the holding case 3 to press the holding case 3 resiliently toward the carriage 2. The resilient pressure of the spring 19 is adjustable at an optimum value by means of a pressure adjusting screw 20 provided on the holding plate 18.

The spring leaf hinge 14 and the plate 12 of the upper magnetic head assembly 30 are formed, for example, by cutting a single conductive spring plate incorporated into the holding case 3 by insert molding in a predetermined shape. The plate 21 has a nonelastic construction. One end of the spring leaf hinge 14 is positioned adjacent to the plate 21. The spring leaf hinge 14 is divided, for example, into five divisions to use the spring leaf hinge 14 also as lead terminals. Five lead wires 22 extending from the upper magnetic head 13 are fixed adhesively to the plate 21 and respectively connected to the ends of the five divisions of the spring leaf hinge 14. Of the five lead wires 22, three lead wires are used for reading/writing and two lead wires are used for erasing.

Part of the holding case 3 is projected alongside the flexible portion 14a of the spring leaf hinge 14 to form seats 3a which rest on the cylindrical supporting surface 12. Thus the holding case 3 is swingable around the cylindrical supporting surface 12. Thus, the holding case 3 is positioned stably by three points of abutment including the two points of abutment of the seats 3a and the cylindrical supporting surface 12 and one point of abutment of the upper magnetic head 13 and the lower magnetic head 6. A holding plate 17a is fixed to the upper surface of the fastening plate 16 with a screw 17 so as to extend over the seats 3a in order to inhibit the upward dislocation of the holding case 3 due to external vibrations or shocks so that the magnetic heads 7 and 13 will not be damaged. Shielding plates 23 and 24 are attached to a portion of the carriage 2 mounted with the lower magnetic head 7 and to a portion of the holding case 3 mounted with the upper magnetic head 13 so as to cover the lower magnetic head 7 and the upper magnetic head 13, respectively, to protect the magnetic heads 7 and 13 from noise.

In attaching the upper magnetic head 13 to the holding case 3, first, the holding case 3 is held in alignment with a reference plane, then the height and the parallelism of the upper magnetic head 13 with respect to the reference plane is adjusted minutely under a microscope by adjusting the position off a chuck holding the upper magnetic head 13, then the upper magnetic head 13 is temporarily fixed to the holding case 3 by a quick hardening adhesive at a predetermined height and parallelism, and then an adhesive is put into the gap between the underside of the upper magnetic head 13 and the holding case 3 to fix the upper magnetic head adhesively to the holding case 3.

Such a fixing method is effective for conventional disk driving apparatus which require adjustment of height and parallelism of the sliding surface of the upper magnetic head for individual upper magnetic head assemblies. However, such a fixing method takes a long time for adjustment and increases assembly costs. Fixed upside/movable downside systems require adjustment of azimuth but only of height and parallelism of the upper magnetic head. Accordingly, there is a need for a method of attaching the upper magnetic head 13 to the holding case without using a microscope and adjusting means having a high degree of freedom of motion.

SUMMARY OF THE INVENTION

Accordingly, it is an object of the present invention to provide a magnetic head unit capable of being manufactured without use of either a microscope or adjusting means having a high degree of freedom of motion, and a method of manufacturing such a magnetic head unit.

According to the present invention, a magnetic head receiving hole is formed in a magnetic head supporting member and a magnetic head is fixed adhesively to the inner surface of the magnetic head receiving hold with an adhesive.

In manufacturing a magnetic head unit according to the present invention, a magnetic head supporting member is placed on a jig. The supporting member is provided with a hole for receiving a magnetic head. The jig includes a magnetic head supporting groove and supporting protrusions for the magnetic supporting member formed with top surfaces in parallel to and at a predetermined height from a bottom surface of the magnetic head supporting groove. A magnetic head is inserted into the magnetic head receiving hole from above the magnetic head supporting member so that the magnetic head rests on the bottom surface of the magnetic head supporting groove with a sliding surface thereof in contact with the bottom surface of the magnetic head supporting groove. The magnetic head is temporarily fixed at a side surface of the slider to an inner surface of the magnetic head receiving hole with a quick hardening adhesive, and then removed with the magnetic head supporting member attached thereto. The magnetic head is firmly fixed to the magnetic head supporting member by putting an adhesive into the clearance between the side surface of the slider of the magnetic head and the inner surface of the magnetic head receiving hole.

This method of manufacturing a magnetic head unit permits unique determination of the parallelism of the sliding surface of the magnetic head to the magnetic head supporting member by the parallelism of the magnetic head supporting member to the bottom surface of the magnetic head supporting groove of the jig. Therefore, the magnetic head can be fixed at a predetermined accuracy to the magnetic head supporting member without using any particular means for adjusting the magnetic head and measuring the position of the magnetic head. The magnetic head can be very simply attached to the magnetic head supporting member simply by inserting the magnetic head into the magnetic head receiving hole of the magnetic head supporting member supported on the jig, so that the magnetic head rests on the bottom surface of the magnetic head supporting groove with the sliding surface thereof in contact with the bottom surface of the magnetic head supporting groove and by adhesively fixing the magnetic head at the side surface to the slider thereof to the inner side surface of the magnetic head receiving groove with an adhesive.

The above and other objects, features and advantages of the present invention will become more apparent from the following description of a preferred embodiment thereof taken in conjunction with the accompanying drawings.

BRIEF DESCRIPTION OF THE DRAWINGS

FIG. 1(e) is a top view of the magnetic head assembly.

DESCRIPTION OF THE PREFERRED EMBODIMENT

Figure 1A:
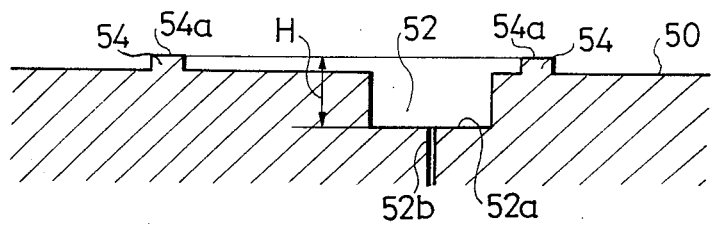
FIGS. 1a, 1b, 1c and 1d are fragmentary sectional views of assistance in explaining the processes of a magnetic head unit manufacturing method according to the present invention.
Figure 1B:
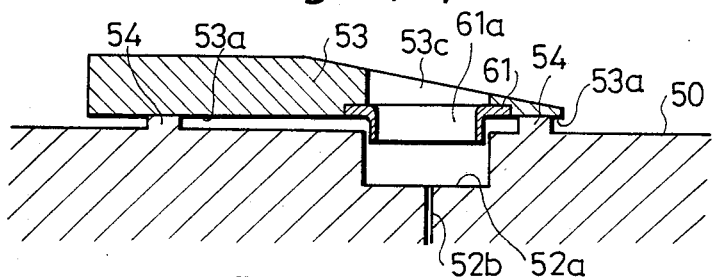
Figure 1C:
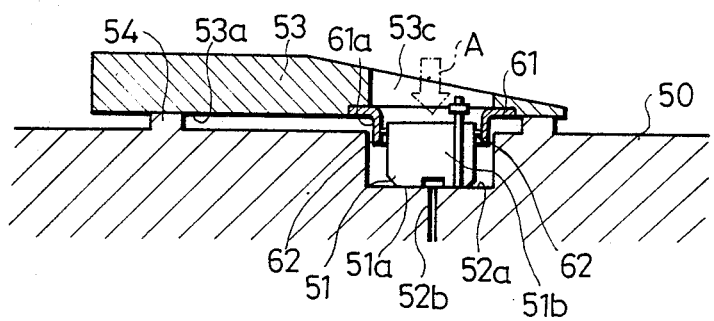
Figure 1D:
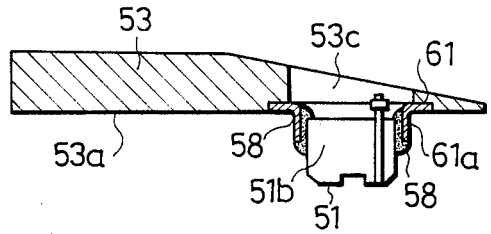
Figure 2:
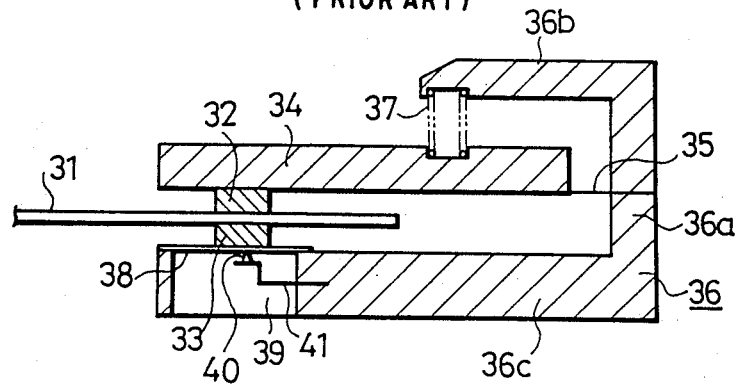
FIGS. 2 and 3 are schematic sectional views of conventional magnetic head units of the fixed upside/movable downside system, respectively.
Figure 3:
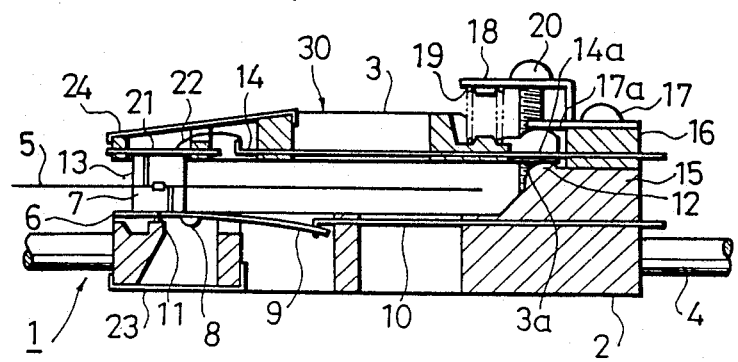

An example of an upper magnetic head assembly manufactured by a method according to the present invention is illustrated in FIG. 1d. As illustrated in FIG. 1d, the upper magnetic head comprises, as principal components, an upper magnetic head 51 and a holding case 53 (a magnetic head supporting member) mounted with the upper magnetic head 51 and capable of moving vertically relative to a carriage, not shown. A magnetic head receiving hole 53c for receiving the upper magnetic head 51 is formed in the extremity of the holding case 53. A magnetic head mount 61 made of a conductive metal and having a tubular portion 61a formed as a hollow elongated cylinder open at both ends for loosely receiving the slider 51b of the magnetic head 51 is provided at the lower end of the magnetic head receiving hole 53c. The clearance between the side surface of the slider 51b of the magnetic head 51 and the inner surface of the tubular portion 61a is filled with an adhesive to attach the magnetic head 51 fixedly to the holding case 53. A looped core 51c provided so as to extend from the gap in the sliding surface 51a to the backside of the magnetic head 51 projects in a free state into the magnetic head receiving hole 53c.

The method of manufacturing the upper magnetic head assembly shown in FIG. 1d will be described hereinafter.

Referring to FIG. 1a, a jig 50 has a magnetic head supporting groove 52 for supporting the magnetic head 51 thereon, formed in the central portion thereof and supporting protusions 54 for supporting the holding case thereon, formed in the upper surface thereof. The bottom surface 52a of the magnetic head supporting groove 52 and the upper surfaces 54a of the supporting protusions 54 are finished so that the upper surfaces 54a of the supporting protusions 54 are in parallel to and at a predetermined height H from the bottom surface 52a of the magnetic head supporting groove 52. The height H corresponds to the distance of the sliding surface 51a of the magnetic head 51 from the lower surface of the holding case 53. A suction hole 52b for sucking air from the magnetic head supporting groove 52 opens into the magnetic head supporting groove 52.

The holding case 53 is formed by molding a synthetic resin and is provided at the extremity with a magnetic head receiving hole 53c in which the magnetic head 51 is received and supported by means of the magnetic head mount 61 having a tubular portion 61a in which the magnetic head 51 is received loosely.

Reference surfaces 53a are formed in the holding case 53 in portions where the holding case 53 is supported by the supporting protrusions 54. In this embodiment, the magnetic head 51 is joined to the holding case through the magnetic head mount 61 made of a metal; however, it is also possible to join the magnetic head 51 directly to the inner surface of the magnetic head receiving hole 53c.

The method according to the present invention employs the jig 50 and is carried out in the following four processes.

In the first process, the holding case 53 is place on the supporting protrusions 54 of the jig 50 as illustrated in FIG. 1b. The holding case 53 is supported on the jig 50 with the reference surfaces 53a in parallel to the bottom surface 52a of the magnetic head supporting groove 52 as illustrated in FIG. 1b.

In the second process, the magnetic head 51 is inserted in the magnetic head receiving hole 53c of the holding case 53 from above the holding case 53 as indicated by an arrow A to place the magnetic head 51 in the magnetic head supporting groove 52 with the sliding surface 51a thereof in surface-to-surface contact with the bottom surface 52a of the magnetic head supporting groove 52 as illustrated in FIG. 1c. After the magnetic head 51 has been put in place, air is sucked throught the suction hole 52b to hold the magnetic head 51 on the bottom surface 52b of the magnetic head supporting groove 52. In this embodiment, the magnetic head 51 is held in place by suction, however, the magnetic head 51 need not necessarily be held fixedly for positioning the magnetic head at a requisite accuracy.

In the third process, the magnetic head 51 is fixed temporarily to the magnetic head mount 61 by putting a quick hardening adhesive 62 in the clearance between the side surface of the slider 51b of the magnetic head 51 and the inner surface of the tubular portion 61a of the magnetic head mount 60. Thus, the magnetic head 51 is joined to the holding case with the sliding surface 51a in parallel to and at the predetermined distance corresponding to the height H from the reference surfaces 53a of the holding case 53.

In the fourth process, the holding case 53 incorporating the magnetic head 51 temporarily fixed thereto in a predetermined position is removed from the jig 50, and then the magnetic head 51 is fixed firmly to the holding case by filling the clearance between the slider 51b of the magnetic head 51 and the tubular portion 61a with an adhesive such as an epoxy adhesive.

The magnetic head 51 is thus attached to the holding case 53 by the use of the jig 50 through the above-mentioned processes without requiring any particular adjustment of the projection and parallelism of the sliding surface 51a of the magnetic head 51 with respect to the reference surfaces 53a of the holding case 53.

Since the tubular portion 61a of the magnetic head mount 61 is tubular, the holding case 53 and the magnetic head 51 can be very easily assembled by simply inserting the complete magnetic head 51 into the magnetic head receiving hole 53c of the holding case 53. On the contrary, in assembling a conventional magnetic head assembly having a magnetic head supported on a holding case by means of a gimbal spring, a through hole needs to be formed to insert a core therethrough, a back core needs to be attached after inserting the core through the hole and a coil needs to be wound on the core. Accordingly, the method of the present invention is capable of automatic processes using automated machines.

In this embodiment, the side surface of the slider 51a of the magnetic head 51 is joined to the inner surface of the tubular portion 61a; however, it is also possible to provide the slider 51a of the magnetic head at the upper end thereof with a flange capable of covering the upper opening of the magnetic head mount 61 and to fix both the flange and the side surface of the slider 51a to the magnetic head mount 61 with an adhesive so that the area of adhesion is increased, and thereby the strength of adhesion is enhanced.

As apparent from the foregoing description, according to the present invention, a magnetic head receiving hole is formed in a magnetic head supporting member and a magnetic head is attached to the magnetic head supporting member by adhesively fixing the slider of the magnetic head at the side surface to the inner surface of the magnetic head receiving hole. Thus, the present invention provides a magnetic head unit capable of being very simply manufactured. Furthermore, the method of manufacturing such a magnetic head unit according to the present invention is capable of simply and accurately manufacturing magnetic head units. Still further, the method according to the present invention simplifies assembling work and reduces assembling cost.

Although the invention has been described in its preferred form with a certain degree of particularity, it is to be understood that many changes and variations are possible in the invention without departing from the scope and spirit thereof.

What is claimed is:

1. A magnetic head and slider assembly comprising:
   a magnetic head including a slider having side surfaces;
   a magnetic head and slider supporting member having a portion defining a receiving hole for said magnetic head and slider;
   a mount attached to said supporting member having a tubular portion formed as a hollow elongated cylinder for loosely receiving said magnetic head and slider, said tubular portion having an inner surface surrounding said side surfaces of said slider;
   an adhesive for attaching said side surfaces of said slider to the inner surface of said tubular portion of said mount.

2. A magnetic head and slider assembly according to claim 1, wherein said mount attached to the magnetic head and slider supporting member is formed by a metallic cylinder.

* * * * *

UNITED STATES PATENT AND TRADEMARK OFFICE
CERTIFICATE OF CORRECTION

PATENT NO. : 4,920,438
DATED : April 24, 1990
INVENTOR(S) : Masatoshi Furukawa and Kazuo Kobayashi It is certified that error appears in the above-identified patent and that said Letters Patent is hereby corrected as shown below:

Title page:

Inventors: "Kobayshi" should read --Kobayashi--

Signed and Sealed this

Thirtieth Day of July, 1991

Attest:

HARRY F. MANBECK, JR.

*Attesting Officer*   *Commissioner of Patents and Trademarks*